(12) United States Patent
Nolton et al.

(10) Patent No.: US 11,725,791 B1
(45) Date of Patent: Aug. 15, 2023

(54) FAUX FIREPLACE WITH VARIABLE FLAME SPEED

(71) Applicant: Modern Flames, LLC, Phoenix, AZ (US)

(72) Inventors: Jim Nolton, Scottsdale, AZ (US); Kris Richardson, Tempe, AZ (US); Harland Aguirre, Glendale, AZ (US); David Faszer, Gilbert, AZ (US)

(73) Assignee: RPG BRANDS, Phoenix, AZ (US)

( * ) Notice: Subject to any disclaimer, the term of this patent is extended or adjusted under 35 U.S.C. 154(b) by 0 days.

(21) Appl. No.: 17/968,380

(22) Filed: Oct. 18, 2022

Related U.S. Application Data

(63) Continuation-in-part of application No. 17/666,200, filed on Feb. 7, 2022, now Pat. No. 11,473,745.

(51) Int. Cl.
*F21S 10/04* (2006.01)
*G11B 27/031* (2006.01)
*F24C 7/00* (2006.01)

(52) U.S. Cl.
CPC ............ *F21S 10/043* (2013.01); *F24C 7/004* (2013.01); *G11B 27/031* (2013.01)

(58) Field of Classification Search
CPC ....... F21S 10/043; F24C 7/004; G11B 27/031
See application file for complete search history.

(56) References Cited

U.S. PATENT DOCUMENTS

| | | | |
|---|---|---|---|
| 5,195,820 A * | 3/1993 | Rehberg | F24B 1/1808 428/18 |
| 2006/0041655 A1 * | 2/2006 | Holloway | H04N 21/42224 709/223 |
| 2006/0188831 A1 * | 8/2006 | Hess | F24C 7/004 40/428 |
| 2008/0216366 A1 * | 9/2008 | Purton | F24C 7/004 312/204 |
| 2009/0241386 A1 * | 10/2009 | Abileah | G02F 1/1336 40/428 |
| 2016/0327227 A1 * | 11/2016 | Green, Jr. | F21V 23/026 |
| 2018/0347818 A1 * | 12/2018 | Birnbaum | F24C 7/004 |
| 2022/0090751 A1 * | 3/2022 | Van Schie | G02B 30/60 |
| 2022/0132100 A1 * | 4/2022 | Van Schie | F24C 7/004 |

* cited by examiner

*Primary Examiner* — Bryon T Gyllstrom
(74) *Attorney, Agent, or Firm* — Calhane Meadows PLLC; Robert C. Klinger

(57) ABSTRACT

A faux fireplace having a video faux flame with a selectively controllable speed. A video file stored in memory includes a video loop of the faux flame, wherein a user can selectively control a playback speed of the video loop. This allows a user to control a presentation of the flame, and a flicker rate of the flame to establish an ambiance. A remote control, such as a smart mobile device running an app, can be used to establish the speed of the of the video faux flame and other parameters.

20 Claims, 26 Drawing Sheets

| Icon | Description |
|---|---|
| ⏻ | Power ON/OFF<br>Note: Press & Hold for 5 Seconds to Place Fireplace in Remote Pairing Mode |
| 🔥 | Switches Between all Color Presets and Styles.<br>Presets: Style 1: Yellow(Default), Orange, Blue, Aqua, Purple, White, Style 2: Yellow(Default), Orange, Blue, Aqua, Purple, White, Style 3: Yellow(Deault), Orange, Blue, Aqua, Purple, White<br>Displays: 1F-2F-3F-4F-5F-6F-1F-2F-3F-4F-5F-6F-1F-2F-3F-4F-5F-6F<br>Does Not Affect Speed or Sound.<br>Note: Press & Hold for 5 Seconds to Start Connecting with APP |
| 💡 | Switches Between 10 RGB Down-Light Colors and Auto Cycle.<br>Orange,Red,Blue,Yellow,Green,Purple,Aqua,Magenta,Rose,White, Autocycle Displays: 01-02-03-04-05-06-07-08-09-10-11<br>Note: Press & Hold 5 Seconds for Night Light Mode |
| 🪵 | Switches Between 10 RGB Embed Bed Colors and An Auto Cycle.<br>Orange,Red,Blue,Yellow,Green,Purple,Aqua,Magenta,Rose,White, Autocycle Displays: 01-02-03-04-05-06-07-08-09-10-11<br>Note: Press & Hold 5 Seconds to Turn OFF Optional Logs |
| 🔥 | Heat Cycles Between OFF/Fan/Low/High. Displays: H0--F-H1-H2<br>Note: Press & Hold 5 Seconds to Lock/Unlock Heater &Thermostat & Wi-Fi |
| 🌡 | Thermostat Cycles Through Desired Temperatures.<br>Note:Press & Hold 5 Seconds to Toggle °C & °F. Displays Like Chart:<br><br>\| NO \| 0 \| 1 \| 2 \| 3 \| 4 \| 5 \| 6 \| 7 \| 8 \| 9 \| 10 \| N \|<br>\| °C \| 20 \| 21 \| 22 \| 23 \| 24 \| 25 \| 26 \| 27 \| 28 \| 29 \| 30 \| C \|<br>\| °F \| 68 \| 70 \| 72 \| 74 \| 76 \| 78 \| 80 \| 82 \| 84 \| 86 \| 88 \| F \| |

FIG. 1C

| Icon | Description |
|---|---|
| ⏻ | Power ON/OFF<br>Note: Press & Hold for 5 Seconds to Start Connecting with APP |
| 🔥 | Modern Flames Home Button (Returns to Default Setting)<br>Default Setting: Flame Style 1, Flame Color Yellow, Ember Bed Orange, Downlight Orange, Flame Speed Default, Sound Level1(low) |
| (-🔥+) | 🔥 Cycles Between 3 Flame Styles. Maintain The Current Flame Color.<br>Styles: Flame Style 1, Flame Style 2, Flame Style 3<br>Displays: F1-F2-F3<br>∧ Cycles Up Through the PRESENT'S of Current Flame Style<br>Present Colors: Yellow (Default), Orange, Blue, Green, Purple, White.<br>Displays: 1F, 2F, 3F, 4F, 5F, 6F<br>Does Not Affect Speed or Sound<br>∨ Cycles Down Through the PRESENT'S of Current Flame Style<br>Present Colors: White, Purple, Green, Blue, Orange, Yellow (Default)<br>Display: 6F, 5F, 4F, 3F, 2F, 1F<br>Does Not Affect Speed or Sound |
| (-🔥+) | SEE BELOW FOR PRESET DEFINITIONS<br>− Decreases Flame Speed of Current Style and Color.<br>Speeds: Fast, Default, Slow. Displays: 03-02-01<br>+ Increses Flame Speed of Current Style and Color.<br>Speeds: Slow, Default, Fast. Displays: 01-02-03 |
| 💡 | Switches Between 10 RGB Down-Light Colors and an Auto Cycle.<br>Orange,Red,Blue,Yellow,Green,Purple,Aqua,Magenta,Rose,White,<br>Autocycle Displays: 01-02-03-04-05-06-07-08-09-10-11<br>Note: Press & Hold 5 Seconds For Night Light Mode |
| 💡 | Changes Downlight Brightness Level OFF/25%/50%/75%/100%<br>Displays: L0-L1-L2-L3-L4 |
| 🔥 | Switches Between 10 RGB Embed Bed Colors and An Auto Cycle.<br>Orange,Red,Blue,Yellow,Green,Purple,Aqua,Magenta,Rose,White,<br>Autocycle Displays: 01-02-03-04-05-06-07-08-09-10-11<br>Note: Press & Hold 5 Seconds to Turn OFF Optional Logs |
| 🔥 | Changes Embed Bed Brightness Level OFF/25%/50%/75%/100%<br>Displays: E0-E1-E2-E3-E4 |

FIG. 1D

| | |
|---|---|
| ⓘ (clock) | Timer to Turn OFF Unit at Desired Time. From NO Timer to 8 Hours. Displays: 00-30-1H-2H-3H-4H-5H-6H-7H-8H |
| (heat icon) | Heat Cycles Between OFF/Fan/Low/High. Displays: H0--H1-H2 Note: Press & Hold 5 Seconds to Lock/Unlock Heater & Thermostat |
| (Front/Top/Side audio button diagram) | Audio Buttons: Top Button Raises Volume from OFF to Low to Medium to High. Displays: S0-S1-S2-S3 Top Button Raises Volume from High to Medium to Low to OFF. Displays: S3-S2-S1-S0 |
| | PRESETS DEFINED: <u>FLAME STYLE 1</u> 1F: Yellow Flame (1F), Orange Ember Bed (01), Orange Downlight (01) 2F: Orange Flame (2F), Red Ember Bed (02), Orange Downlight (01) 3F: Blue Flame (3F), Aqua Ember Bed (07), Aqua Downlight (07) 4F: Green Flame (4F), Yellow Ember Bed (04), Green Downlight (05) 5F: Purple Flame (5F), Rose Ember Bed (09), Magenta Downlight (08) 6F: White Flame (6F), White Ember Bed (10), White Downlight (10) <u>FLAME STYLE 1</u> 1F: Yellow Flame (1F), Orange Ember Bed (01), Orange Downlight (01) 2F: Orange Flame (2F), Red Ember Bed (02), Orange Downlight (01) 3F: Blue Flame (3F), Aqua Ember Bed (07), Aqua Downlight (07) 4F: Green Flame (4F), Yellow Ember Bed (04), Green Downlight (05) 5F: Purple Flame (5F), Rose Ember Bed (09), Magenta Downlight (08) 6F: White Flame (6F), White Ember Bed (10), White Downlight (10) <u>FLAME STYLE 1</u> 1F: Yellow Flame (1F), Orange Ember Bed (01), Orange Downlight (01) 2F: Orange Flame (2F), Red Ember Bed (02), Orange Downlight (01) 3F: Blue Flame (3F), Aqua Ember Bed (07), Aqua Downlight (07) 4F: Green Flame (4F), Yellow Ember Bed (04), Green Downlight (05) 5F: Purple Flame (5F), Rose Ember Bed (09), Magenta Downlight (08) 6F: White Flame (6F), White Ember Bed (10), White Downlight (10) |

FIG. 1E

| Button | Home Screen | |
|---|---|---|
| | Function | Action |
| 1 | Home Button: Returns the Fireplace to the Default Color Settings. | 1. Press Once: Flame Video changes to flame Style 1, Color Yellow. Ember Bed and Down Light Changes to Orange. Flame Speed Changes to Default and sound Level Changes to Low. |
| 2 | Power Off/On Slider: Turns the Fireplace Off and On. | 1. Slide to the Off Position: Turns the Fireplace OFF.<br>2. Slide to the On Position: Turns the Fireplace ON. |
| 3 | Flame Style: Opens Flame Style Sub-Menu for Selecting Flame Style and Color. 3 Styles with 6 Colors for Each of the Styles. | 1. Press Once: Opens the Flame Style Sub-Menu Page to Select a New Flame Style. |
| 4 | Flame Speed Slider: Changes the Flame Speed of Currently Displayed Flame. Cycles Between Slow, Default, and Fast. | 1. Slide to the Slow Position: Flame Moves at the Slowest Speed. Fireplace Displays: 01<br>2. Slide to the Default Position: Flame moves at the Default Speed. Fireplace Displays: 02<br>3. Slide to the Fast Position: Flame moves at the Fastest Speed. Fireplace Displays: 03 |

FIG. 3B

| A | B | C | D |
|---|---|---|---|
| 5 | Flame Volume Slider: Changes the Sound Effect Volume of the Fireplace Between 4 Different Volumes. Can Cycle Between Off, Default, Medium, High. | 1. Slide to the Off Position: Sound Effects are Turned Off. Fireplace Displays: S0<br>2. Slide to the default Position: Sound Effects are at the Lowest/Default Sound Level. Fireplace Displays: S1<br>3. Slide to the Medium Position: Sound Effects are at the Middle Sound Level. Fireplace Displays: S2<br>4. Slide to the High Position: Sound Effects are at the Highest Sound Level. Fireplace Displays: S3 | |
| 6 | Downlight Button: Opens the Downlight Sub-Menu. | 1. Press Once: Opens the Downlight Sub-Menu Page to Select New Colors for Downlighting. | |
| 7 | Ember Bed Button: Opens the Ember Bed Sub-Menu. | 1. Press Once: Opens the Ember Bed Sub-Menu page to Select New Colors for the Ember Bed | |
| 8 | Heater Button: Opens the Heater Sub-Menu. | 1. Press Once: Opens a New Page to Make Changes to the Heater Settings. | |
| 9 | Timer Button: Opens the Timer Sub-Menu. | 1. Press Once: Opens the Timer Sub-Menu for Various Timer Related Functions. | |

FIG. 3B
(Continued)

Flame Style Options

| Button | Function | Action |
|---|---|---|
| 43 | Return Button: Returns to the Previous Page. | 1. Press Once: Returns to the Previous Page. |
| 45 | Style One Button: Opens the Flame Style One Sub-Menu. | 1. Press Once: Opens the Flame Style One Sub-Menu. |
| 47 | Style Two Button: Opens the Flame Style Two Sub-Menu. | 1. Press Once: Opens the Flame Style Two Sub-Menu. |
| 49 | Style Three Button: Opens the Flame Style Three Sub-Menu. | 1. Press Once: Opens the Flame Style Two Sub-Menu. |

STYLE ONE
COLOR MENU

YELLOW

ORANGE

BLUE

GREEN

PURPLE

WHITE

43

STYLE TWO
COLOR MENU

YELLOW

ORANGE

BLUE

GREEN

PURPLE

WHITE

43 —

STYLE THREE
COLOR MENU

YELLOW

ORANGE

BLUE

GREEN

PURPLE

WHITE

FAUX FIREPLACE WITH VARIABLE FLAME SPEED

PRIORITY

This application is a Continuation-in-Part (CIP) of U.S. Patent Application Ser. No. 17/666,200 entitled Faux Fireplace With Synchronized Lighting filed Feb. 11, 2022 and claims priority therefrom.

TECHNICAL FIELD

The present disclosure relates to faux fireplaces that generate realistic faux flames for homes, apartments, hotels, commercial buildings, and other confined locations.

BACKGROUND

Faux fireplaces are commonly used in personal homes, condominiums, apartments and the like to generate a faux (synthetic or simulated) flame when a real burning fireplace is not allowable or preferred.

This disclosure includes a faux fireplace designed to eliminate the challenges and disadvantages commonly associated with gas or wood burning fireplaces without compromising the realism of the flames.

BRIEF DESCRIPTION OF THE FIGURES

FIGS. 1C-1E illustrates buttons and their function of the remote control and of the control panel;

FIG. 3B illustrates the App home screen, including the function and action of each button of the remote control shown in FIG. 3A:

FIG. 4A-4E illustrates the App style menu options for selecting multiple styles of faux flames and the color of the faux flames;

DETAILED DESCRIPTION

This disclosure includes a faux fireplace having a video faux flame with a selectively controllable flame speed. A video file stored in memory includes a video loop of the faux flame, wherein a user can selectively control the playback speed of the video loop. This feature allows a user to control a presentation of the flame, and a flicker rate of the flame to establish an ambiance. A remote control, such as a smart mobile device running an app, can be used to establish the speed of the of the video faux flame, and other parameters.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals, or light produced or supplied by one system element are imparted to another coupled element. Unless described otherwise, coupled elements or devices are not necessarily directly connected to one another and may be separated by intermediate components, elements or communication media that may modify, manipulate or carry the light, sound, or signals.

Figure 1A:
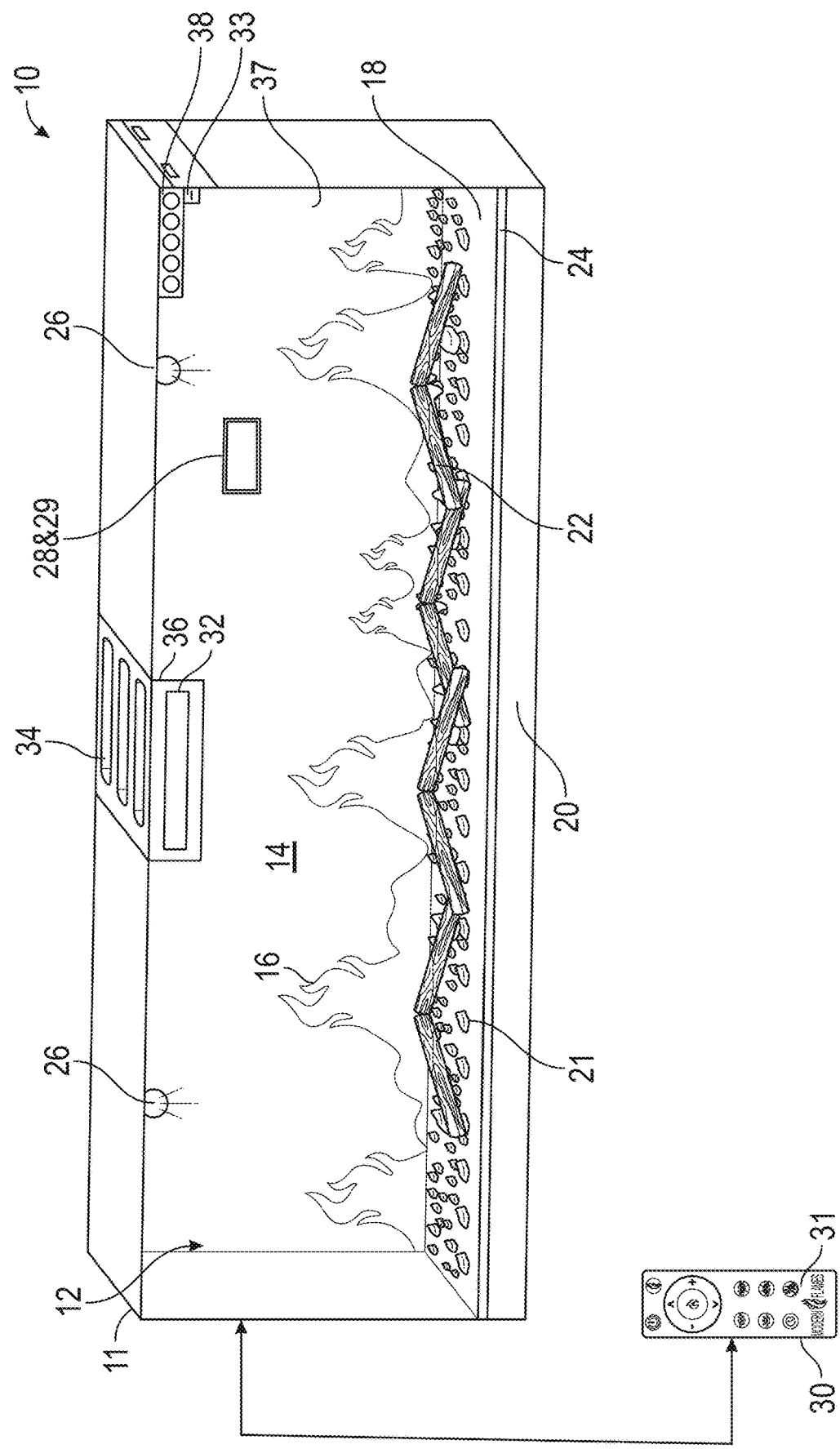
FIG. 1A illustrates a perspective front view of the faux fireplace including a video display generating a displayed faux flame along with a separate, lit ember bed, down-lighting and heater.

Referring to FIG. 1A there is illustrated a faux fireplace 10 having a body 11 including a cavity 12, shown as a chassis having a firebox including a vertically extending electronic video display(s) 14 configured to display a looping video of a faux flame shown at 16. The video display 14 may be formed by one or more panels to display a larger and horizontal faux flame 16. The faux fireplace 10 is configured as an insert that can slide directly into an opening in a wall, such as between studs and surrounded by drywall or other material. The faux fireplace 10 has a rather shallow depth, such as 6 inches, and includes a faux ember bed 18 at the firebox bottom 20 extending forwardly from the video display 14. The ember bed 18 is covered by a media 21, such as glacier crystals or crushed glass, and includes a plurality of resin faux logs 22 positioned on the ember bed 18. Ember bed lighting 24 is positioned under the ember bed 18 and is configured to selectively illuminate the ember bed 18 and media 21 with a selectable color. Down-lighting 26 at the top of the firebox 12 is configured to selectively illuminate the firebox 12 and faux logs 22 from above at a user selectable color.

The ember bed lighting 24 and the down-lighting 26 may be created by a light emitting diode (LED), or the like. The lighting may be comprised of red/green/blue (RGB) lighting. The firebox 12 includes at least one heater 32 configured to generate heat, and vents 34 configured to emit the generated heat using a blower 36.

The ember bed 18 may be formed of a plastic (e.g., Polystyrene or Acrylic) ember bed screen (white color) acting as a diffusion material for the underlaying ember bed lighting 24. The media 21, such as glacier crystals or crushed glass, are laid on top of the ember bed screen to emulate a glowing ember bed of an actual fireplace. Tbc ember bed lighting 24 is positioned uniformly as to not create bright and dim spots on the ember bed screen. The firebox 12 may have a non-clear or colored glass viewing window 37, such as a tea color, such as tempered glass with sanded edges.

Figure 1B:
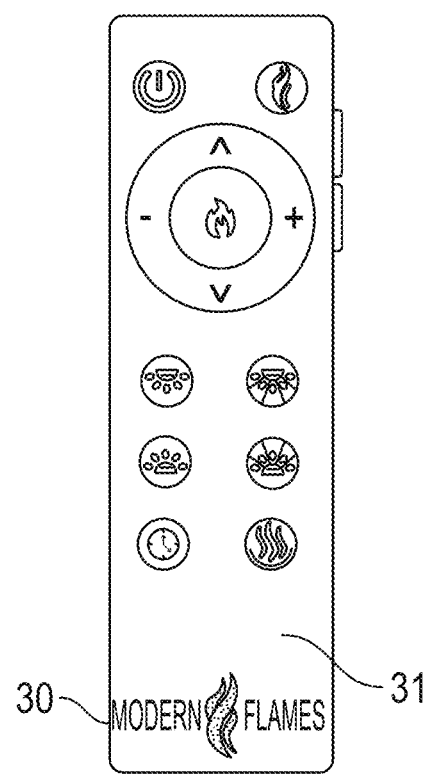
FIG. 1B illustrates a remote control with control buttons, where some buttons are also provided on the control panel located on the fireplace.
Figure 2:
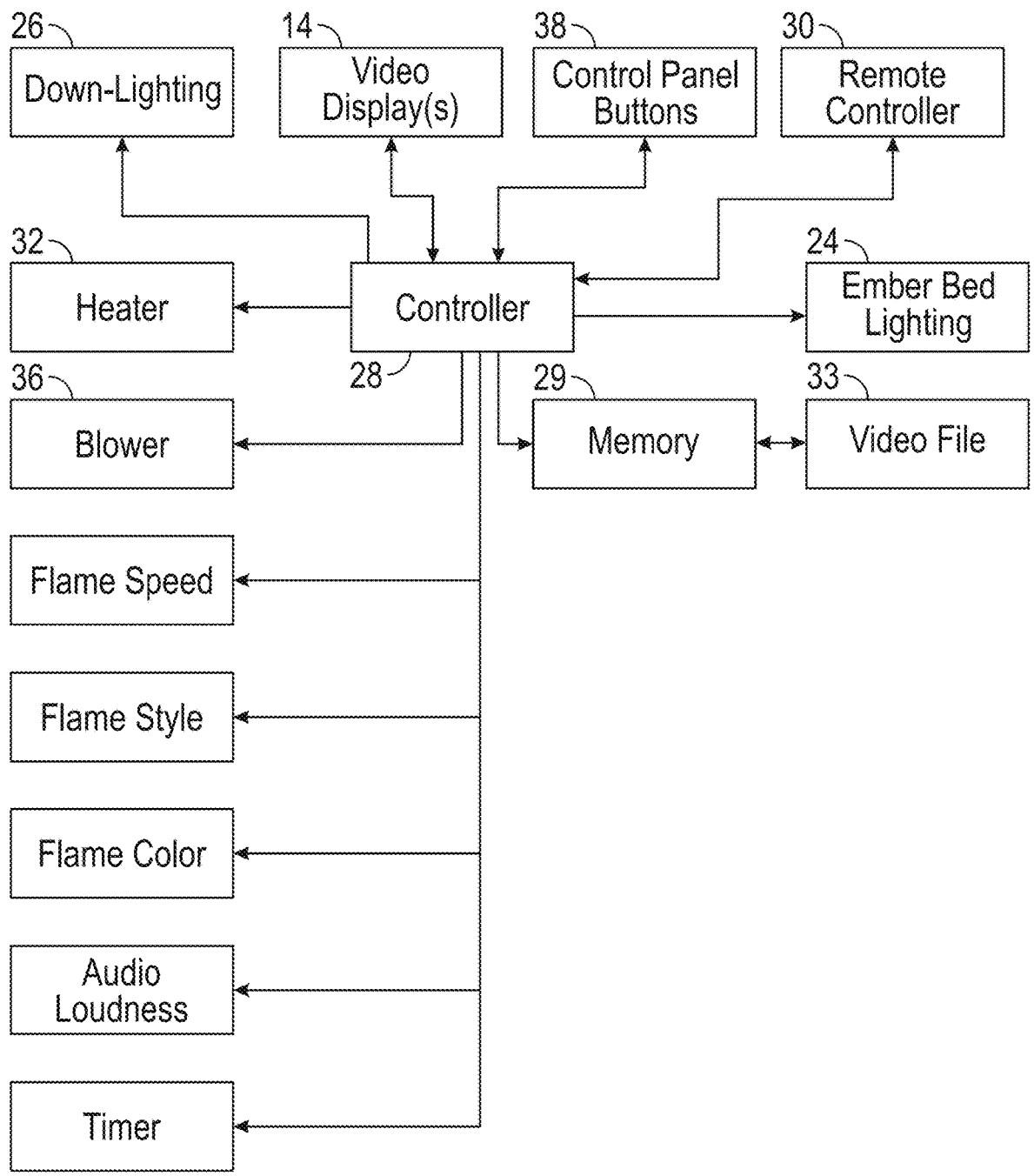
FIG. 2 illustrates a block diagram of the faux fireplace.

The color of the faux flame 16, the ember bed lighting 24 and the down-lighting 26 is selectively controlled by a controller 28 shown in FIG. 2, such as a processor. The controller 28 is controllable by a user using a control panel 38 having buttons located on an upper right corner of the firebox 12 as shown in FIG. 1A, and by using a wireless input device 30 having a user interface 31, such as a remote control having buttons as shown in FIG. 1B. A video file 33 including a looping video of the faux flame 16 is stored in memory 29. The controller 28 controls the display of the looping video of the faux flame 16 on video display 14, including a selectable speed of the displayed looping video. In the example shown in FIG. 1A and FIG. 1B, the control panel 38 and the user interface 31 of the wireless input device 30 have pressable or tappable buttons, wherein each button is shown in the left column of FIG. 1C. FIG. 1D, and FIG. 1E with their assigned functions shown in the right column.

Figure 3A:
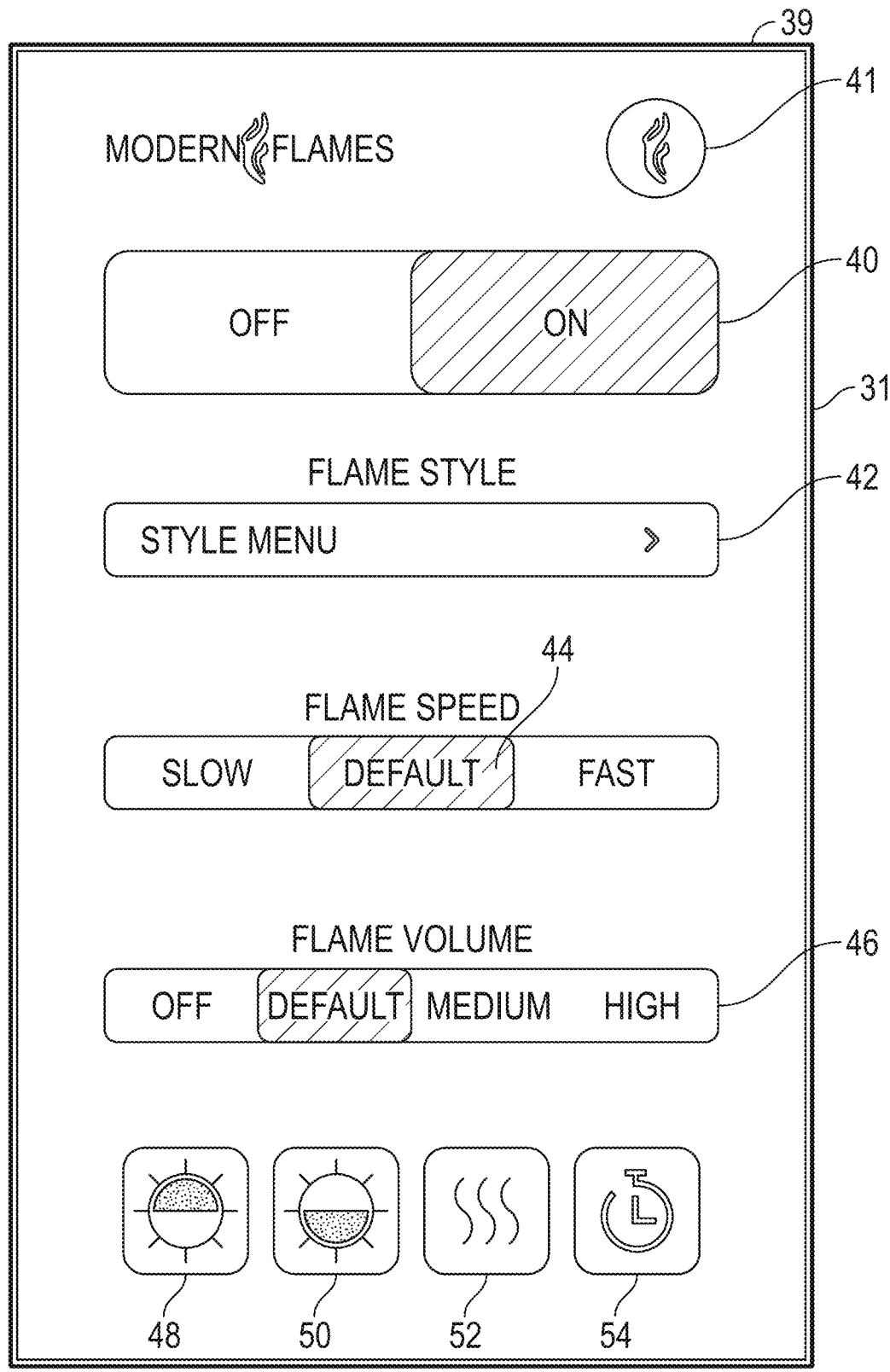
FIG. 3A illustrates a view of a smart phone including an application (App) having a style menu region configured to control the synchronization of the colored lighting.

In an example, the remote control 30 is a wireless start mobile device with the user interface 31 including a touch display controlled by an application (App) stored in the memory 29, as shown in IG. 3A. A home screen 39 that is displayed on the touch display 31 of the smart mobile device is shown in FIG. 3B that details the function and action of each button shown in FIG. 3A. The wireless smart mobile device can be a smart phone, as well as a smart watch, smart eyewear, a laptop computer, and other such smart devices. The smart mobile device controls the controller 28 using standard communication protocols, such as Bluetooth, but can also communicate via a wireless network including the internet. The electronics of the faux fireplace 10 shown in FIG. 2 includes the memory 29 having the video file(s) 33 for generating the looping video of the faux flame 16, which memory 29 may be part of the controller 28 configured as a system on a chip (SOC), and the memory 29 may be removable such as a thumb drive.

Figure 4A:
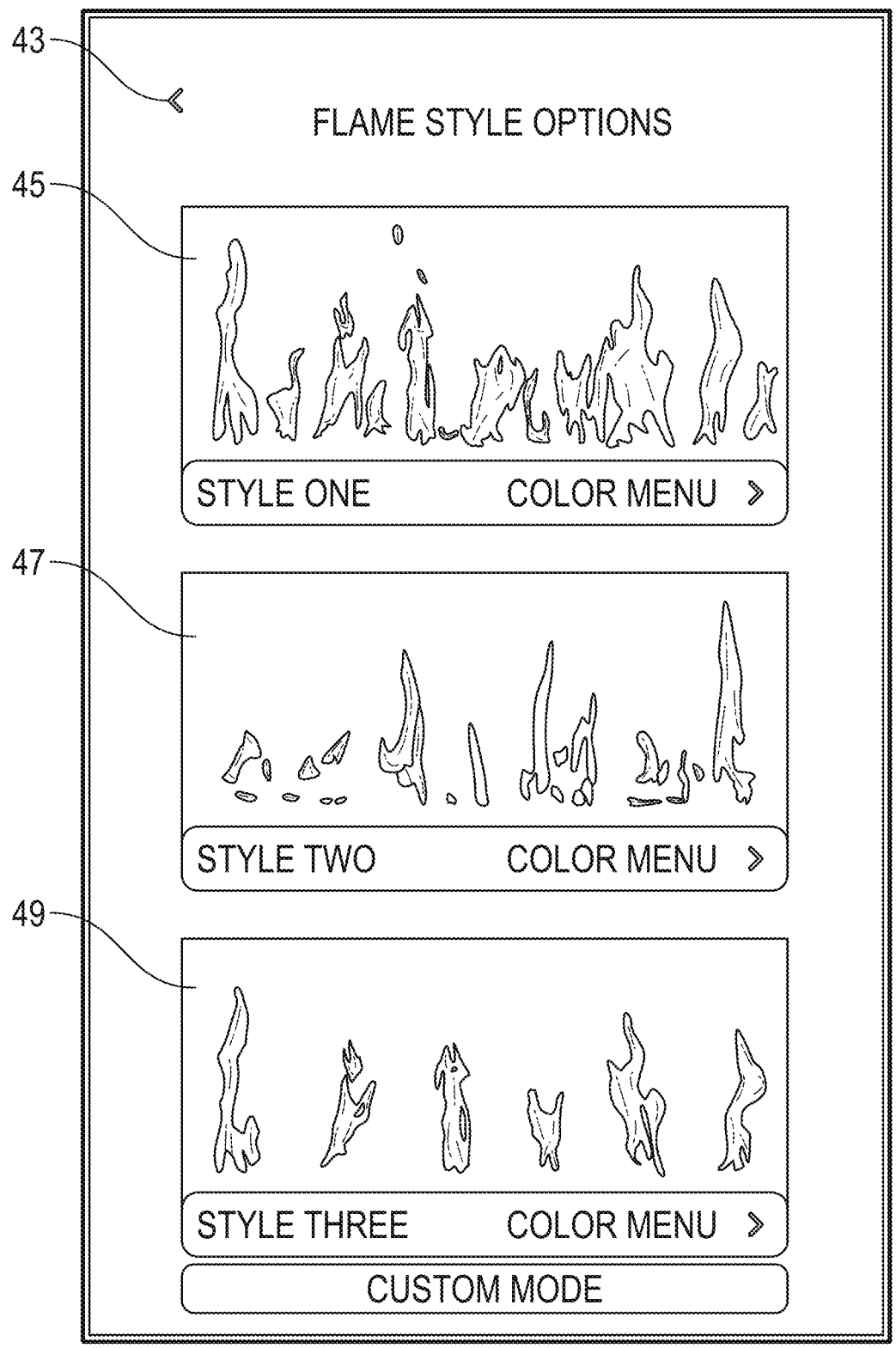
Figure 4C:
Figure 4C:
Figure 4C:
Figure 4C:
Figure 4C:
Figure 4C:
Figure 4D:
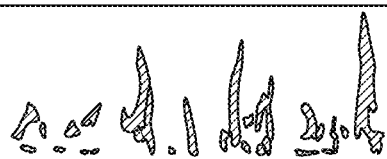
Figure 4D:
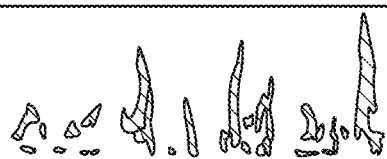
Figure 4D:
Figure 4D:
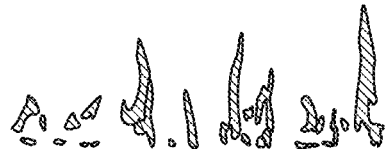
Figure 4D:
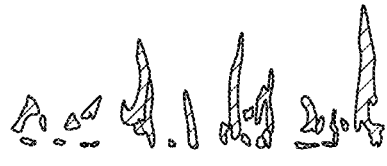
Figure 4D:
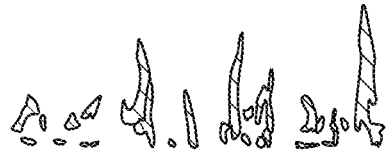
Figure 4E:
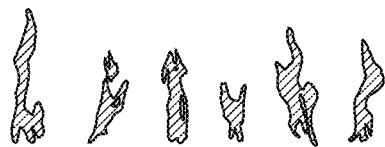
Figure 4E:
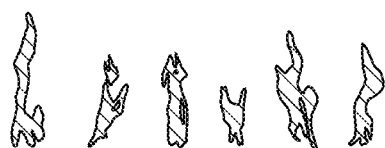
Figure 4E:
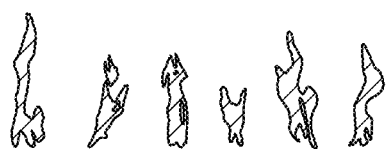
Figure 4E:
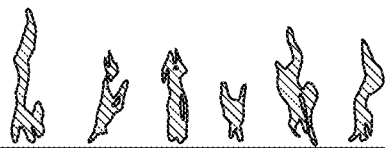
Figure 4E:
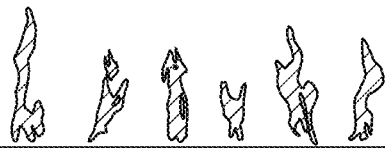
Figure 4E:
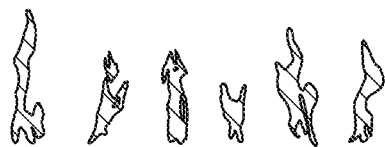

Referring to FIG. 3A, there is illustrated the remote control 30 having touch display 31 operating based on a smart phone App. FIG. 3B illustrates the home screen of the display 31, including the function and action of each displayed button of the remote control 30 shown in FIG. 3A. The display 31 displays a home button 41, a back button 43, and a power on/off slider button at 40. A flame style option button 42 opens a flame sub-menu shown in FIG. 4A for selecting the flame style and color, wherein settings of the flame style and color are selected using displayed buttons 45, 47 and 49 having the functions and actions shown in FIG. 4B. Three flame style settings with six colors for each of the styles are shown in FIG. 4C-4. Tapping the respective displayed flame color shown in FIG. 4C-4F selects the color of the displayed faux-flame 16.

Figure 5A:
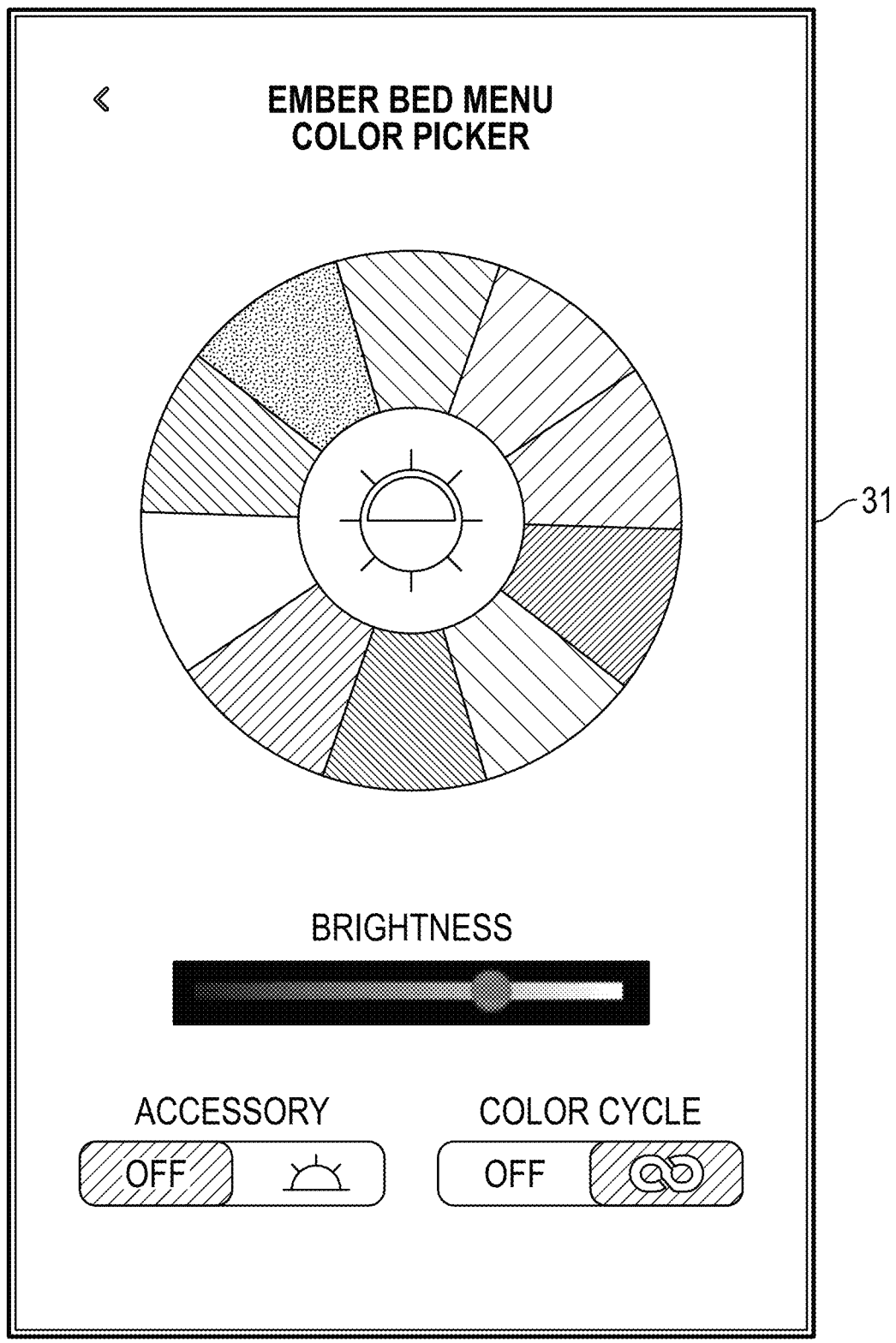
FIG. 5A illustrates a color picker menu for selecting the color of the ember bed lighting.
Figure 5B:
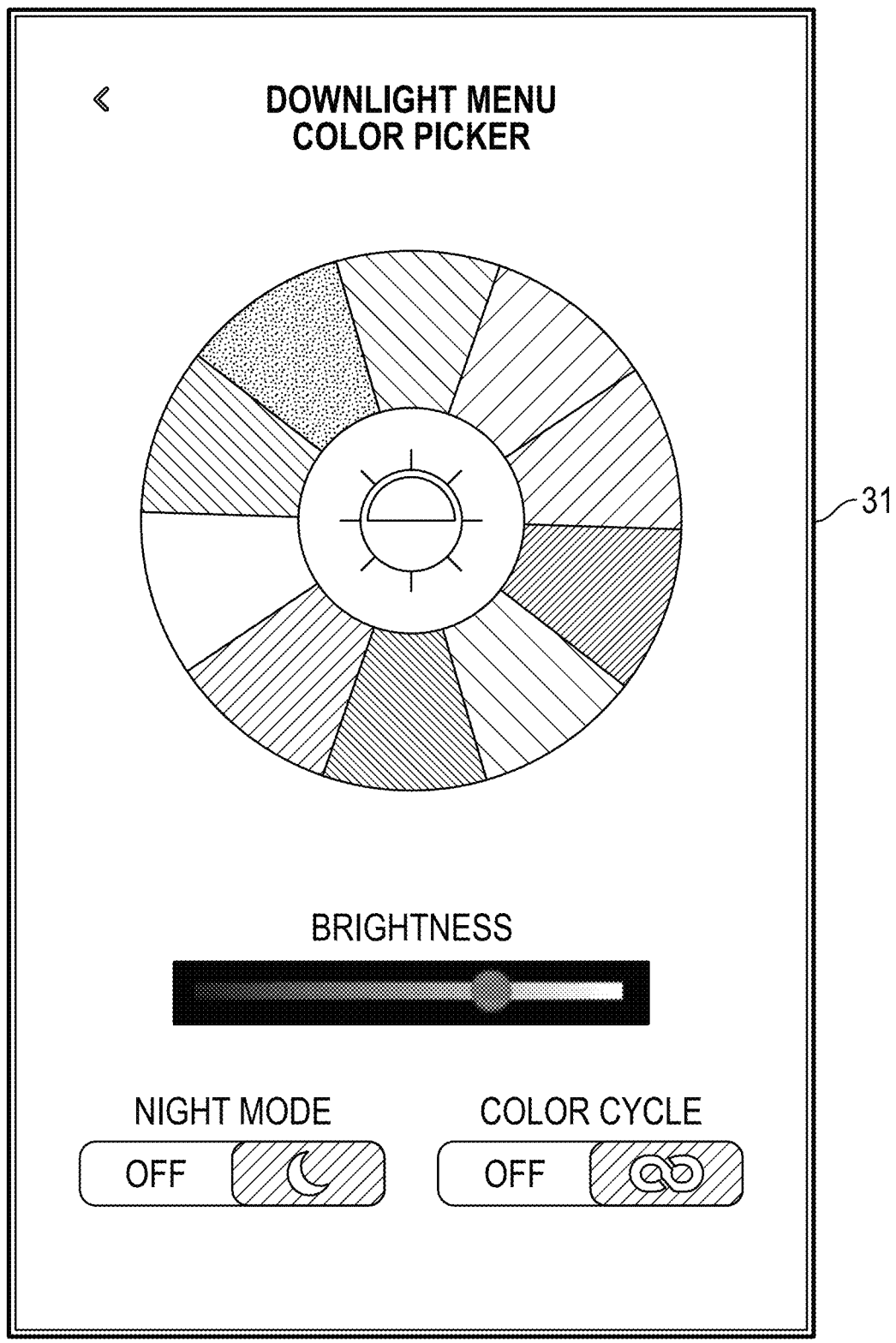
FIG. 5B illustrates a color picker menu for selecting the color of the down-lighting.
Figure 6:
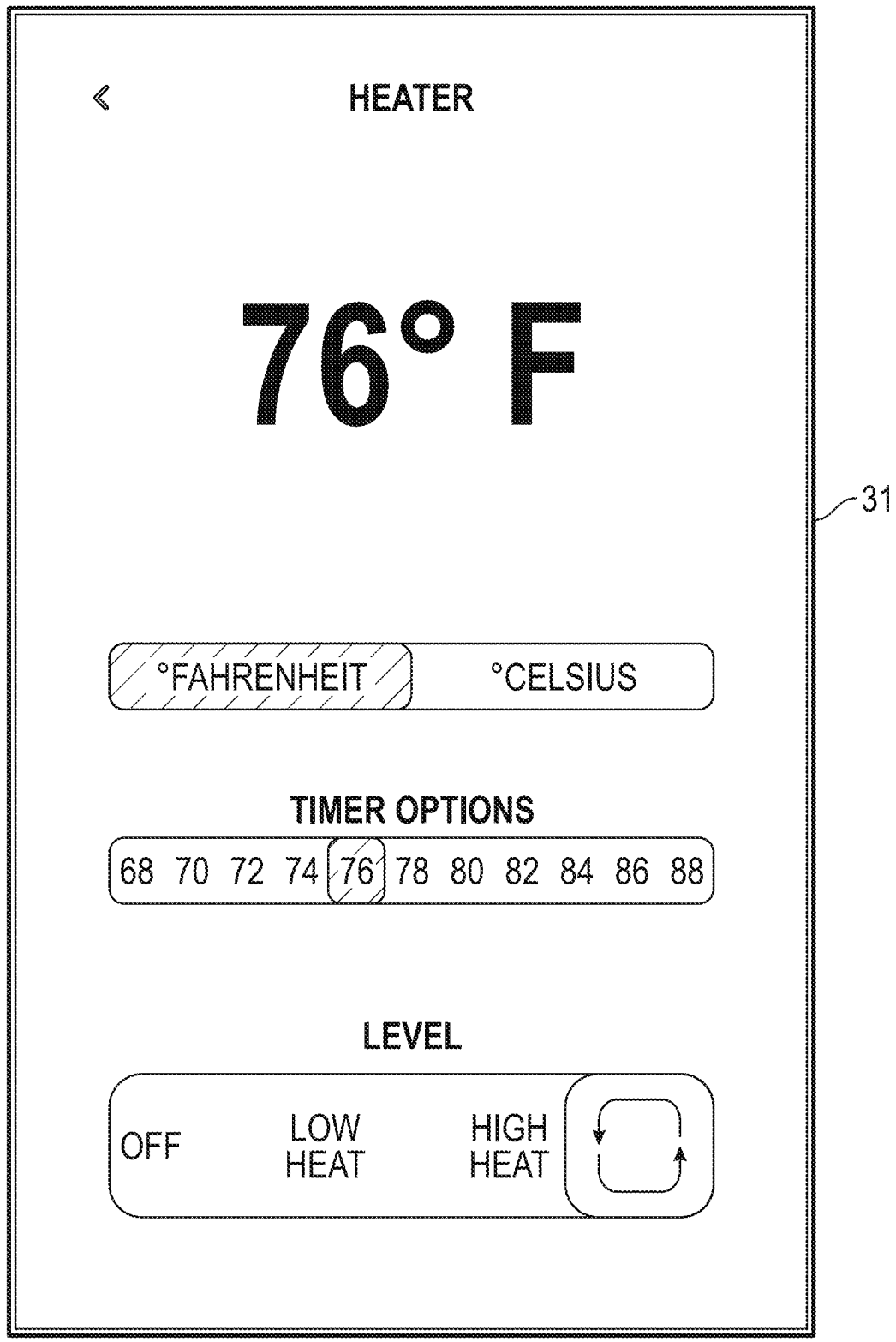
FIG. 6 illustrates a heater menu for selecting a heat setting of a heater integrated in the faux fireplace.
Figure 7:
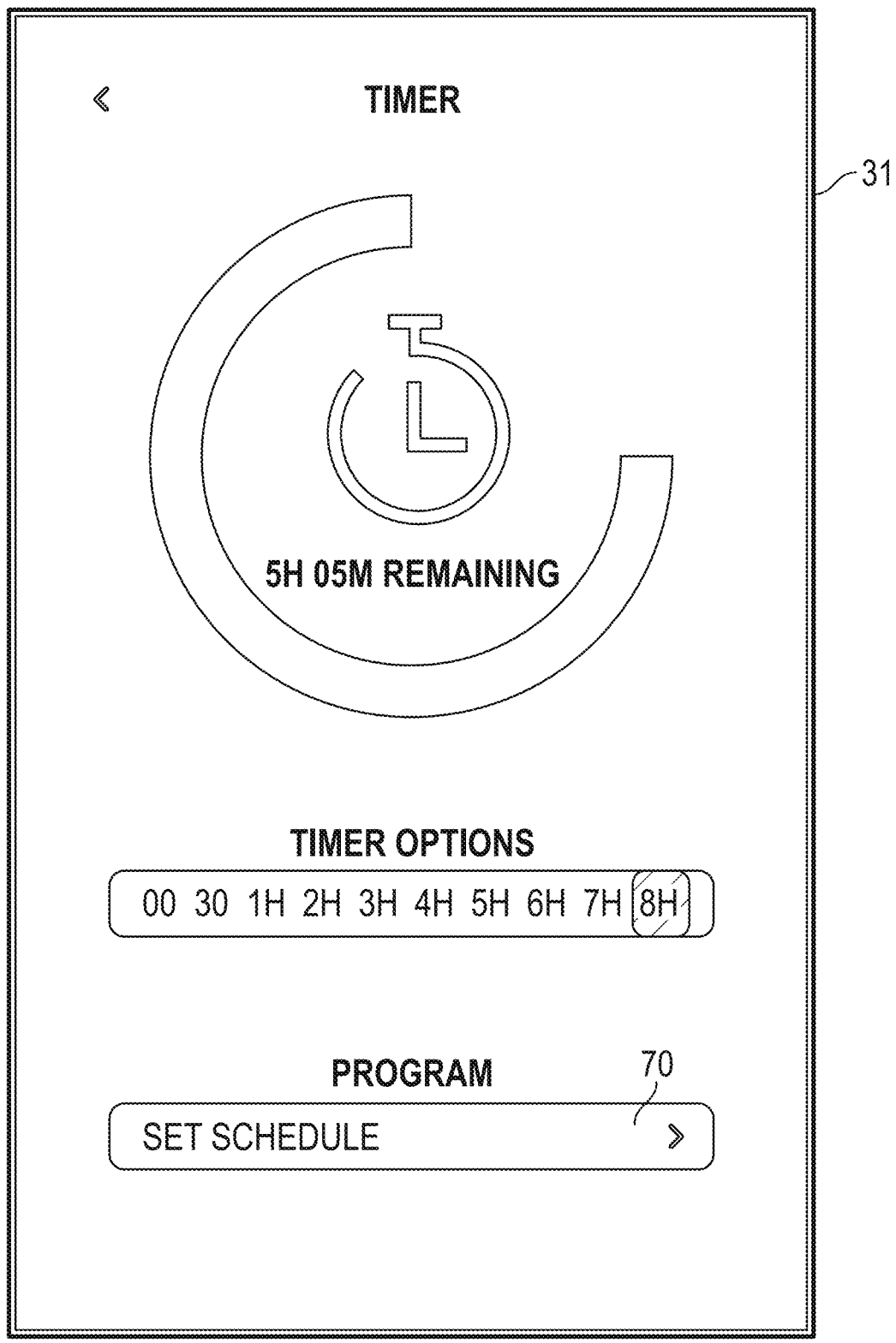
FIG. 7 illustrates the timer menu for selecting a time duration for the heater and an auto turn-off feature.
Figure 8:
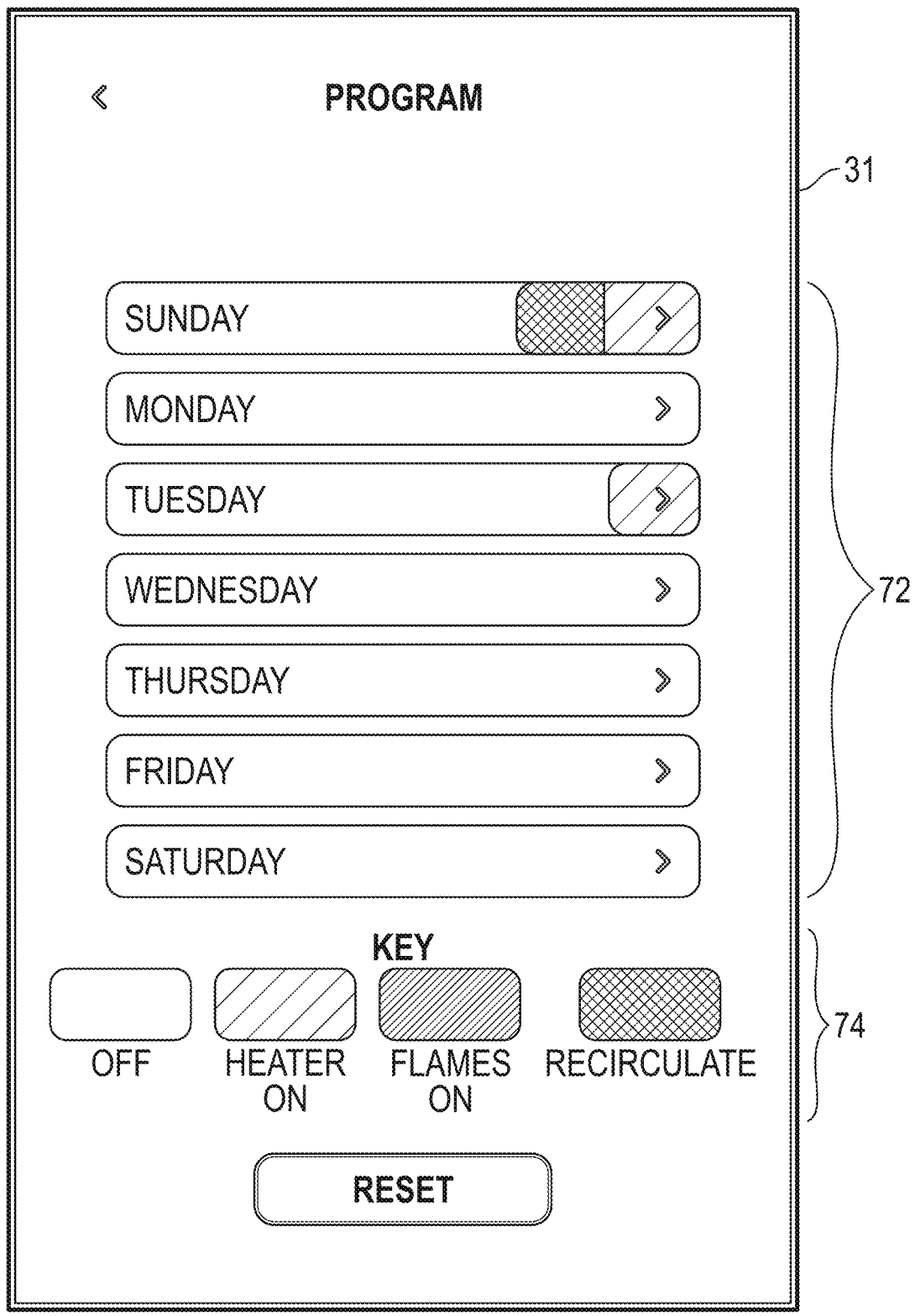
FIG. 8 illustrates a sub-menu enabling the programming schedule for the heater, air recirculation and faux flame.

A flame speed slider button 44 allows the user to change the flame speed of the displayed faux flame 16 between three settings of current flame displayed, shown as slow, default and fast. The flame speed slider button 44 controls the playback speed of the video loop displayed on display 14 to give the user control of the flame and a rate of a flame flicker. A volume control slider button 46 allows the user to change a sound effect and volume, such as a flame crackling sound, displayed as having a selection of off, default, medium and high. An Ember Bed lighting control button 48 has an icon which opens an ember-bed sub-menu shown in FIG. 5A to allow the user to select the color and brightness of the Ember Bed lighting 24. A Down-lighting control button 50 has an icon which opens a down-light sub-menu shown in FIG. 5B to allow the user to select the color and brightness of the down-lighting 26. A heater button 52 has an icon that opens a sub-menu shown in FIG. 6 for controlling the heat generated by the heater 32. A timer button 54 has an icon that opens a sub-menu shown in FIG. 7 for controlling the time duration for operating the auto shut off feature of the faux fireplace 10. The sub-menu includes a set schedule button 70 that opens a weekly programming sub-menu shown in FIG. 8 that has individual seven-day options shown at 72. If a program is set by the user for that day, the color tab is displayed on the ends of that day. Color keys 74 enable the user to control of the heater 32, the faux flame 16, and air recirculation using blower 36. The reset button allows the user to reset of all seven days of any programming.

Figure 9:
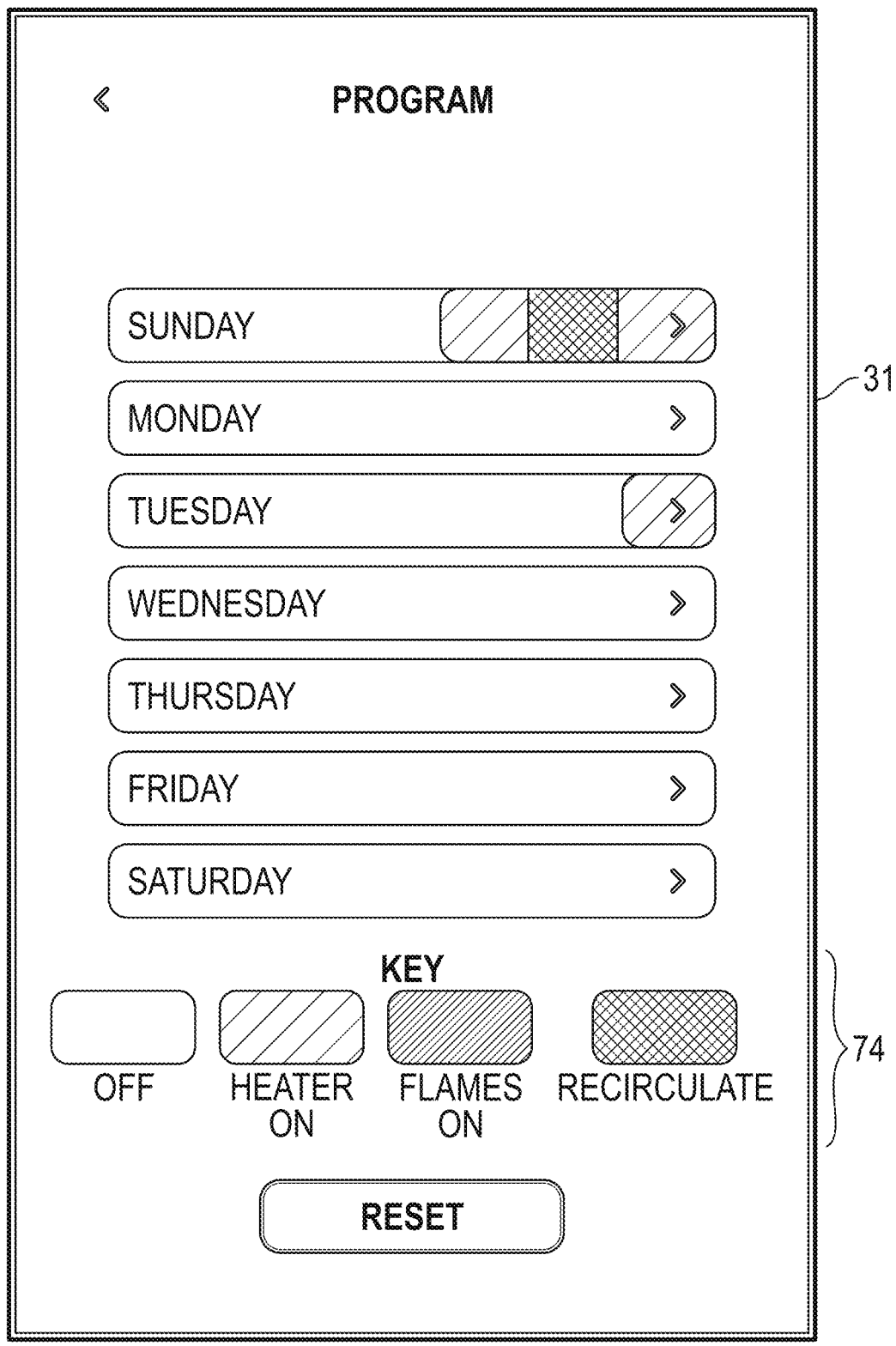
FIG. 9 illustrates Sunday being selected in the sub-menu of FIG. 8 to establish a programmable schedule for operating the faux flame, the heater and the blower.
Figure 10:
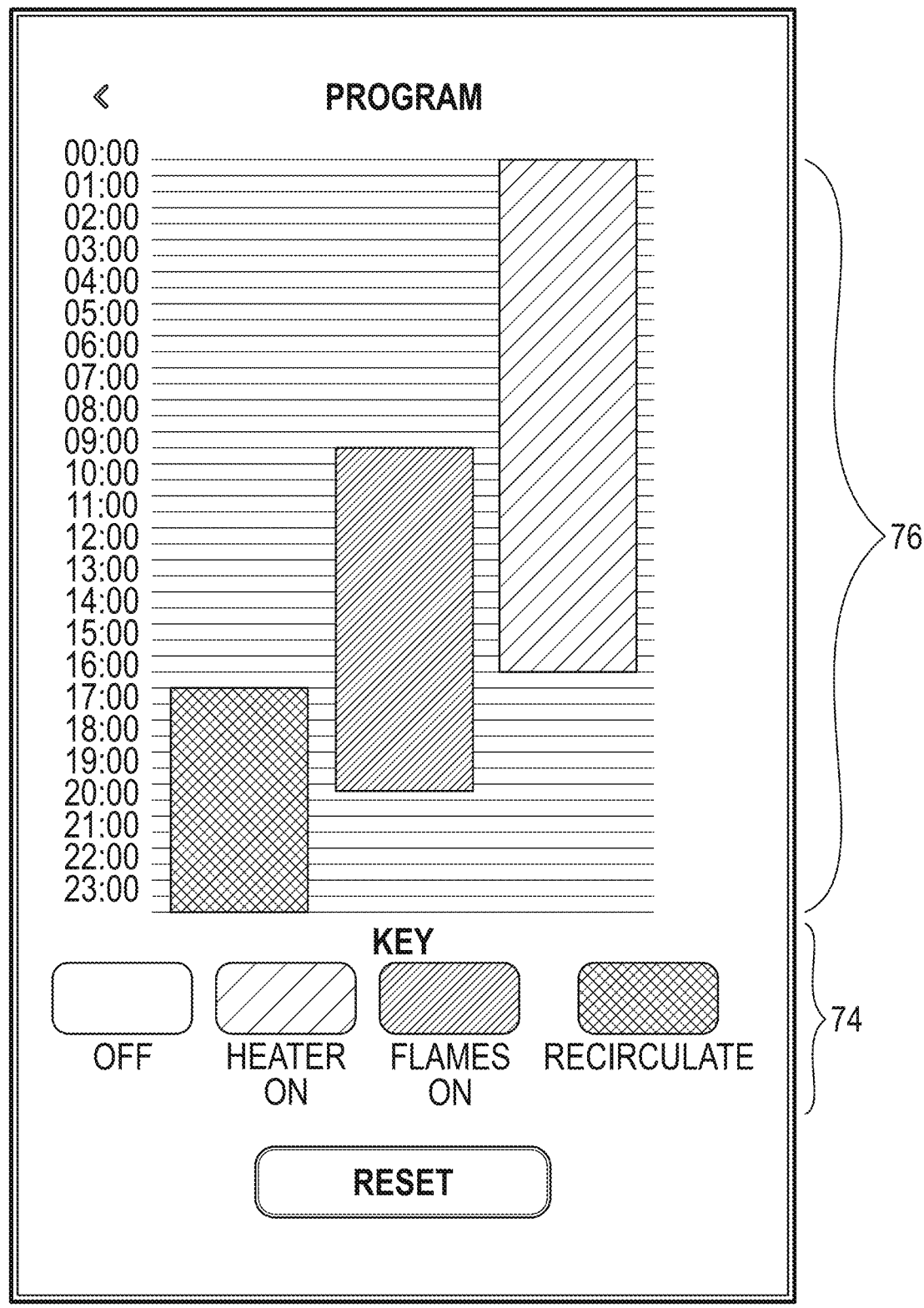
FIG. 10 illustrates an example programmed schedule for Sunday corresponding to the sub-menu of FIG. 9.

FIG. 9 illustrates the individual day programming button for Sunday selected, which upon selection by the user opens the sub-menu illustrated in FIG. 10. After the user selects an option on key 74, a schedule 76 for Sunday can be programmed using remote control 30 by selecting the time of day for each option by swiping a finger over the decided time duration. In an example. FIG. 10 illustrates the heater 32 being on from 17:00 to 24:00, the faux flame 16 being on from 09:30 to 19:30, and the blower 38 being on from 00:00 to 16:00.

Figure 11A:
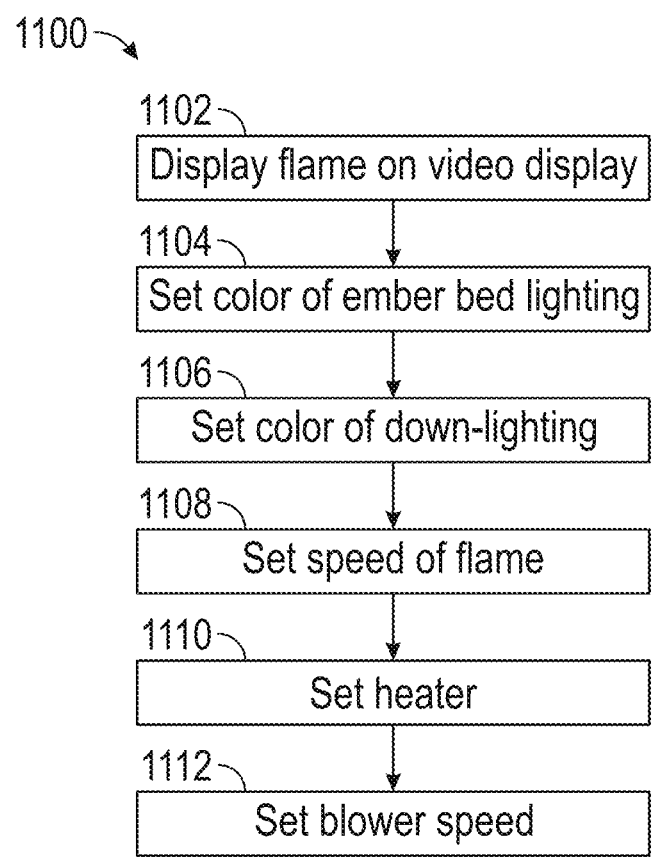
FIG. 11A illustrates a method of operating the faux fireplace.

Referring to FIG. 11A, there is shown a method 1100 for operating the faux fireplace 10. The faux fireplace 10 can be manually controlled by the control panel 38, by the remote control 30 using the smart phone app, or automatically by the program schedule 76 of the smart phone app, executed by controller 28 as discussed.

At block 1102, the display 14 is selected to be on to generate the faux flame 16, using a button of the control panel 38, the remote control 30 as illustrated in FIG. 1B, or the remote control 30 including a smart mobile device having the smart phone app as shown in FIG. 3A. The color of the displayed faux flame 16 and the flame style is a button of the control panel 38, the remote control 30 as illustrated in FIG. 1B, or the remote control 30 including a smart mobile device having the smart phone app as shown in FIG. 3A.

At block 1104, the color of the ember bed lighting 24 is established using a button of the control panel 38, the remote control 30 as illustrated in FIG. 1B, or the remote control 30 including a smart mobile device having the smart phone app as shown in FIG. 3A.

Figure 11B:
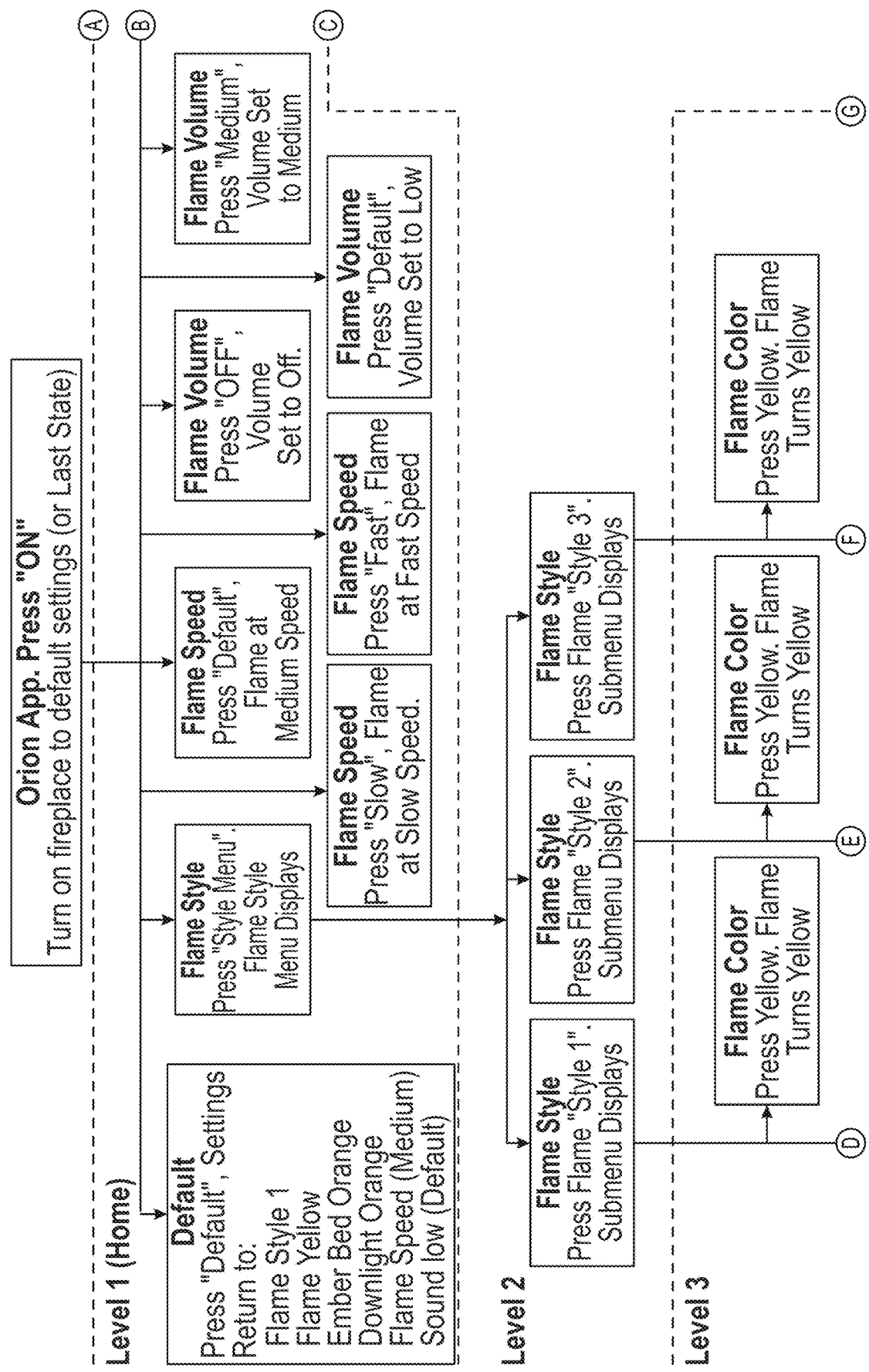
FIG. 11B illustrates a high-level method of operation of the faux fireplace 10.
Figure 11B:
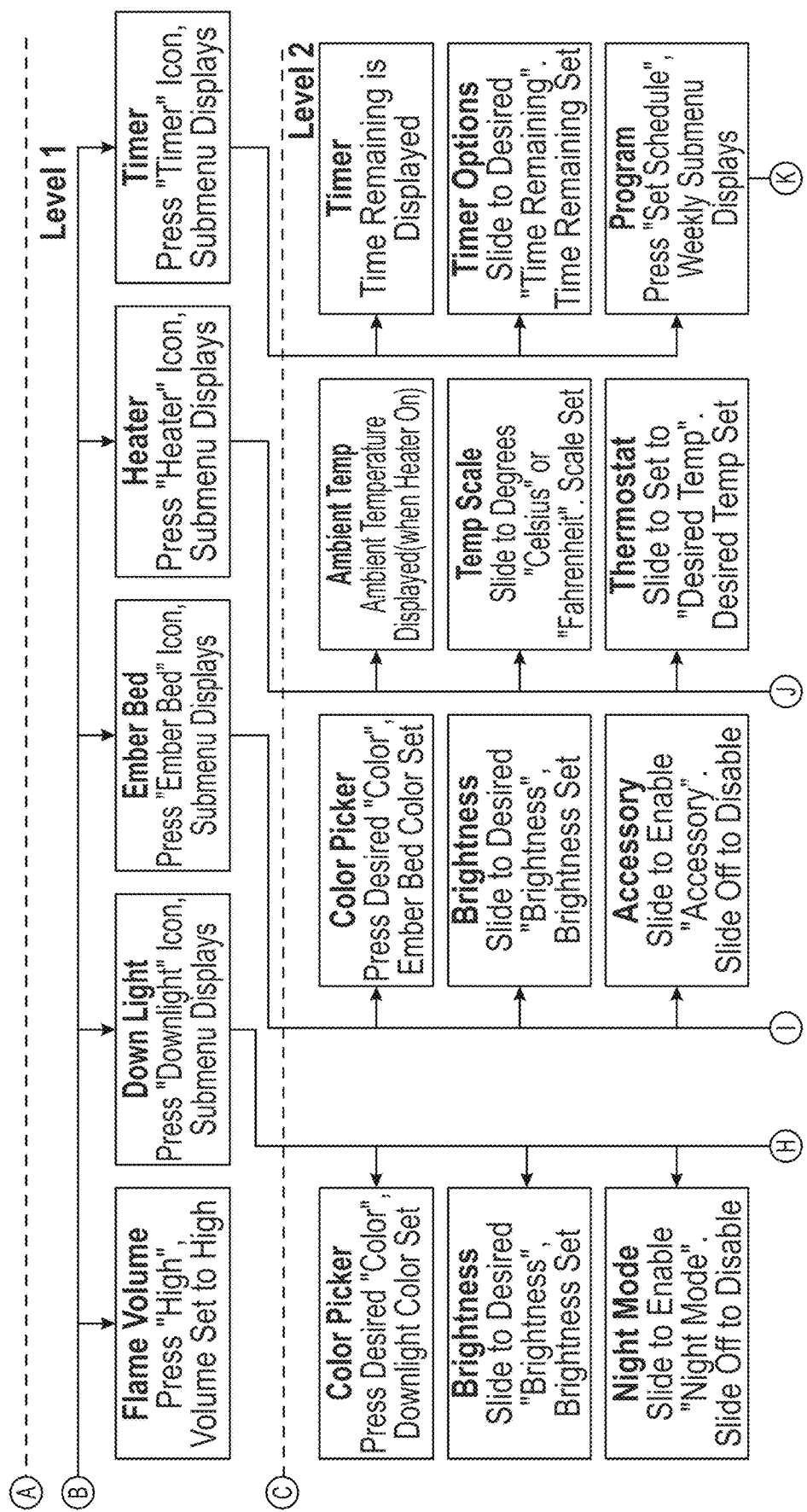
Figure 11B:
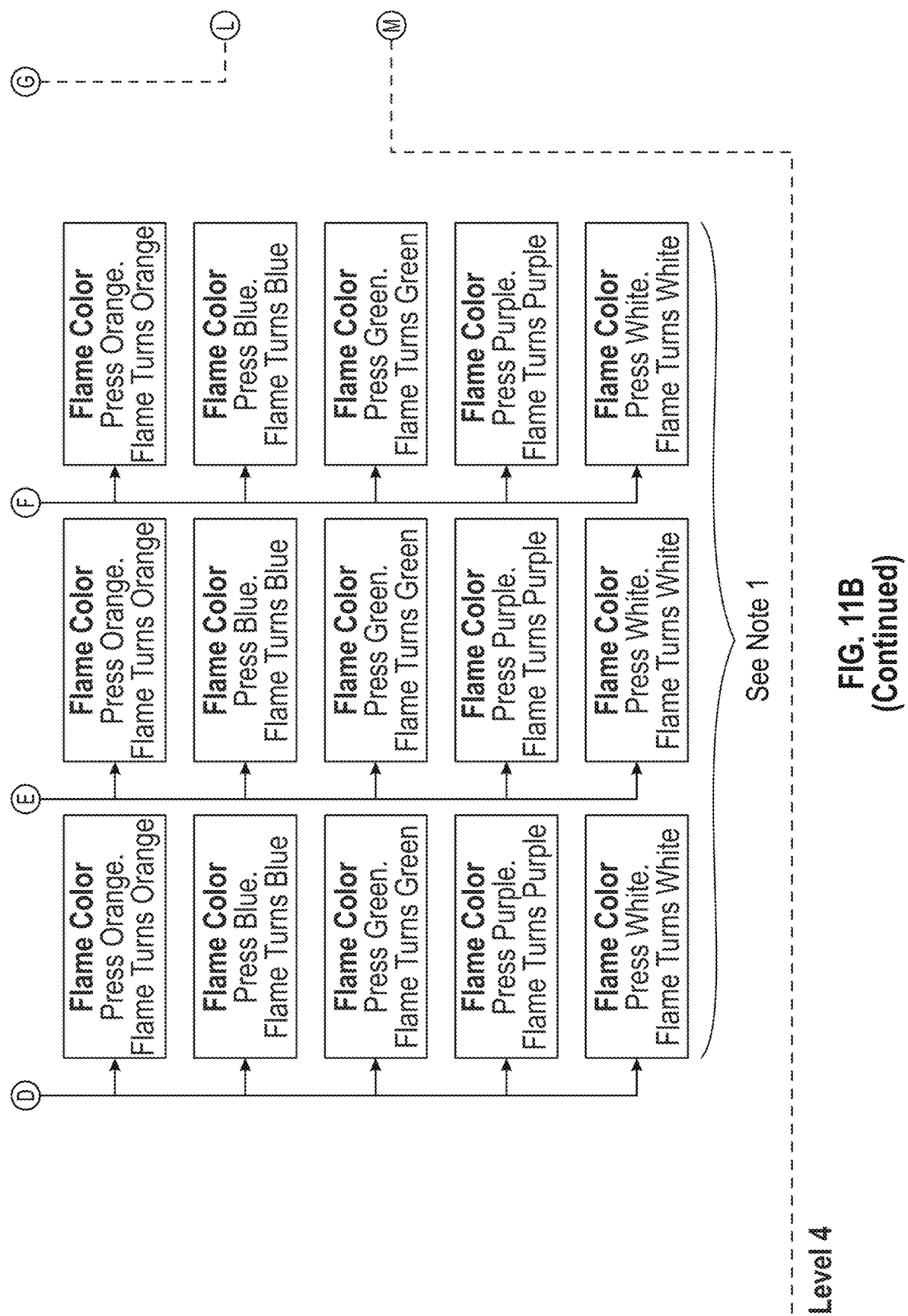
Figure 11B:
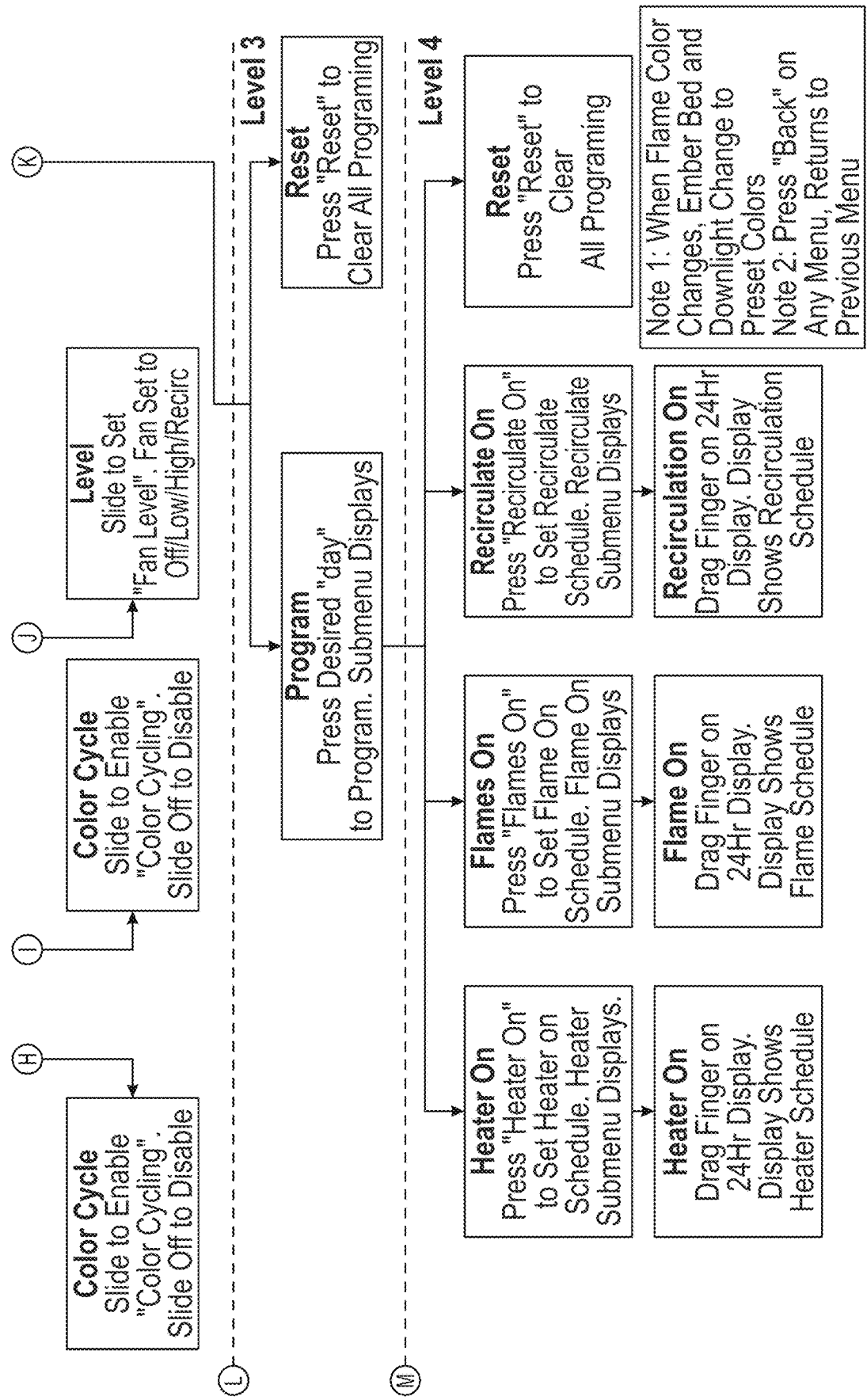

At block 1106, the color of the down-lighting 26 is established a button of the control panel 38, the remote control 30 as illustrated in FIG. 11B or the remote control 30 including a smart mobile device having the smart phone app as shown in FIG. 3A.

At block 1108, the speed of the faux flame 16 as displayed on the video display 14 is established using a button of the control panel 38, the remote control 30 as illustrated in FIG. 1B, or the remote control 30 including a smart mobile device having the smart phone app as shown in FIG. 3A. The faux flame speed selection allows the user to change the playback speed of the video loop of the displayed faux flame 16 between three settings of the current flame displayed, shown as slow, default and fast. The selected speed of the faux flame 16 is established by the controller 28 controlling the playback speed of the video loop stored in memory 29. This feature allows the user to control the speed of the faux flame 16 presentation, including a flicker rate of the faux flame 16, and establish an ambiance for the user.

At block 1110, the heater 32 is controlled using a button of the control panel 38, the remote control 30 as illustrated in FIG. 1B, or the remote control 30 including a smart mobile device having the smart phone app as shown in FIG. 3A.

At block 1112, the blower 36 is controlled by using a button of the control panel 38, the remote control 30 as illustrated in FIG. 1B. or the remote control 30 including a smart mobile device having the smart phone app as shown in FIG. 3A.

FIG. 1B illustrates a high-level method of the operation of the faux fireplace 10.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described herein may also be combined or replaced by alternative features serving the same, equivalent, or similar purpose without departing from the scope of the invention defined by the appended claims.

What is claimed is:

1. A faux fireplace, comprising:
   a body having a cavity;
   a display disposed proximate the cavity and configured to display a faux flame stored in a memory;
   a control input; and
   a controller responsive to the control input and configured to selectively control a playback speed of the faux flame displayed on the display.

2. The faux fireplace as specified in claim 1, wherein the faux flame is a video of a faux flame.

3. The faux fireplace as specified in claim 1, wherein the controller is configured to set a first said playback speed of the faux flame, and a second said playback speed of the faux flame wherein the second playback speed is faster than the first playback speed.

4. The faux fireplace as specified in claim 3, wherein the video of the faux flame is a video loop.

5. The faux fireplace as specified in claim 3, wherein the controller is configured to set at least three said playback speeds.

6. The faux fireplace as specified in claim 1, wherein the playback speed of the displayed faux flame establishes a flicker rate of the displayed faux flame.

7. The faux fireplace as specified in claim 1, wherein the control input is a remote control.

8. The faux fireplace as specified in claim 1, wherein the faux fireplace further includes a heater configured to generate heal, and a blower configured to blow the generated heat.

9. The faux fireplace as specified in claim 8, wherein the controller is configured to use a schedule configured to control the displayed faux flame, the heater, and the blower.

10. The faux fireplace as specified in claim 9, wherein the schedule is configured to control when the faux flame is displayed, when the heater is on, and when the blower is on.

11. A method of controlling a faux fireplace, comprising a body having a cavity, a display disposed proximate the cavity and configured to display a faux flame stored in a memory, a control input, and a controller responsive to the control input and configured to selectively control a playback speed of the displayed faux flame, the method comprising:
    the controller receiving the control input; and
    the controller selectively controlling the playback speed of the displayed faux flame displayed on the display as a function of the received control input.

12. The method as specified in claim 11, wherein the faux flame is a video of a faux flame.

13. The method as specified in claim 11, wherein the controller sets a first said playback speed of the faux flame, and sets a second said playback speed of the faux flame wherein the second playback speed is faster than the first playback speed.

14. The method as specified in claim 13, wherein the video of the faux flame is a video loop.

15. The method as specified in claim 13, wherein the controller sets at least three said playback speeds.

16. The method as specified in claim 11, wherein the playback speed of the displayed faux flame establishes a flicker rate of the displayed faux flame.

17. The method as specified in claim 11, wherein the control input is a remote control.

18. The method as specified in claim 11, wherein the faux fireplace further includes a heater generating heat, and a blower blowing the generated heat.

19. The method as specified in claim 18, wherein the controller uses a schedule to control the displayed faux flame, the heater, and the blower.

20. The method as specified in claim 19, wherein the schedule controls when the faux flame is displayed, when the heater is on, and when the blower is on.

* * * * *